UNITED STATES PATENT OFFICE 2,464,831

COMPOUNDS OF THE OXDIAZOLE SERIES

Frederic B. Stilmar, Wilmington, Del., assignor to E. I. du Pont de Nemours & Company, Wilmington, Del., a corporation of Delaware No Drawing. Application September 16, 1947, Serial No. 774,436

4 Claims. (Cl. 260—307.5)

This invention relates to new compounds of the oxdiazole series and more particularly to the production of new and desirable red vat dyes which are anthraquinonyl oxdiazole compounds, and the intermediates employed in their preparation.

While it is recognized that the vat dyes of the anthraquinone series in general exhibit excellent fastness properties when applied to cellulose materials and are therefore particularly desirable for the dyeing of cotton and related fibers, it is also known that desirable shades of red in the anthraquinone vat dye series have been very difficult to obtain and continued research is being carried out in order to produce more desirable shades of red dyes in this series.

It is therefore an object of this invention to produce new and desirable red vat dyes in the anthraquinone vat dye series, and more particularly to produce dianthraquinonyl oxdiazoles which carry an amino group in at least one of the anthraquinone nuclei in alpha position and ortho to the connecting linkage between the anthraquinone nucleus and the oxdiazole ring. A further object of the invention is to provide intermediates necessary for the production of these new anthraquinone oxdiazole compounds.

I have found that new and valuable red vat dyes of the anthraquinone series, having good fastness and application properties and which dye in desirable red shades, can be prepared by effecting ring closure of an N,N'-dianthraquinone carbonyl hydrazine to the 2,5-di(anthraquinonyl)-1,3,4-oxdiazole where one of the anthraquinone radicals carries in the alpha position ortho to the connecting linkage to the oxdiazole group an amino radical or a radical which on vatting will be converted to the amino group. A second anthraquinone group may also carry an amino or nitro radical in the same position or elsewhere in that nucleus.

These new dyes, and the intermediates required for their preparation, may be produced by first forming the mono-acid hydrazides of the 2-anthraquinone carboxylic acid, then further condensing with a 2-anthraquinone acid chloride to produce the di-acid hydrazides which, in turn, can be ring closed to the oxdiazole with acid ring closing agents, preferably thionyl chloride or p-toluene sulfonic acid. Where one or both of the anthraquinone carbonyl chlorides employed as the starting material contain the nitro group, this nitro group can be converted to the amino radical by the known methods.

The following examples are given to illustrate the invention. The parts used are by weight, unless otherwise specified.

Example 1

28.5 parts of 1-amino-2-carbonyl chloride are added to a slurry of 19.5 parts of hydrazine sulfate in 450 parts of water in which 31.8 parts of soda ash are dissolved, and the suspension is heated at from 90° to 95° C. for two hours. The resulting red product, which is 1-aminoanthraquinone-2-carboxylic acid hydrazide of the formula:

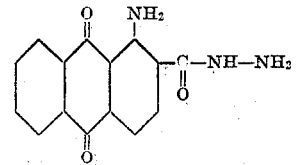

is filtered off, washed and dried.

Example 2

28 parts of 1-aminoanthraquinone-2-carboxylic acid hydrazide of Example 1, and 28 parts of 1-aminoanthraquinone-2-carbonyl chloride are heated in 440 parts of nitrobenzene for one hour at 200° C. The resulting N,N'-di(1-aminoanthraquinone-2-carbonyl) hydrazine is obtained as a crystalline product in a yield of 41 parts. This hydrazine dyes cotton in dull red shades that change to violet with alkalies.

Example 3

14 parts of N,N'-di(1-aminoanthraquinone-2-carbonyl)-hydrazine, prepared as described in Example 2, 4 parts of p-toluene sulfonic acid and 150 parts of trichlorobenzene are heated at 205° C. for four hours, or until a test dyeing is fast to alkali. Unchanged starting material changes blue with alkali, and its presence in the final red dyestuff can be therefore easily detected. The 2,5-di(1'-amino-2'-anthraquinonyl)-1,3,4-oxdiazole, which is isolated in good yield by filtering and washing with alcohol, dyes cotton from an alkaline hydrosulfite vat in strong bright bluish-red shades of good fastness, particularly to washing and bleach. It is represented by the formula:

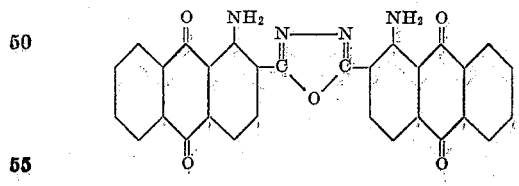

Example 4

165 parts of 1-nitroanthraquinone-2-carbonyl chloride are added gradually to a solution of 100 parts of hydrazine sulfate and 165 parts of soda ash in 2625 parts of water. The suspension is heated at from 65° to 70° C. for three hours. The colorless to tan product is filtered off, washed and dried, resulting in a yield of 157 parts of 1-nitroanthraquinone-2-carboxylic acid hydrazide of the formula:

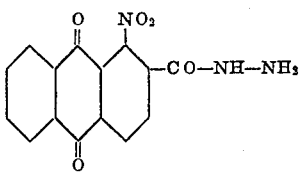

having a melting range of from 288° to 300° C. If too high a temperature is employed in this reaction, reduction of the nitro group takes place with the excess hydrazine.

Example 5

30.5 parts of 1-nitroanthraquinone-6-carbonyl chloride are added to a solution of 17.7 parts of hydrazine hydrate (85%) in 400 parts of ethyl alcohol (95%). The slurry is heated to from 60° to 65° C. and held for 20 minutes. The 1-nitroanthraquinone-6-carboxylic acid hydrazide of the formula:

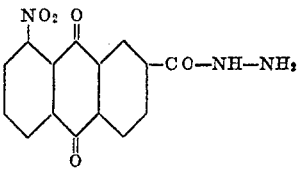

is filtered off, washed with water and dried. It is obtained in a yield of 28.5 parts and has a melting range of from 227° to 230° C.

Example 6

135 parts of 1-nitroanthraquinone-2-carboxylic acid hydrazide of Example 4, 135 parts of 1-nitroanthraquinone-2-carbonyl chloride and 1800 parts of nitrobenzene are heated at from 170° to 175° C. for three hours. The colorless crystalline N,N'-di(1-nitroanthraquinone-2-carbonyl)-hydrazine of the formula:

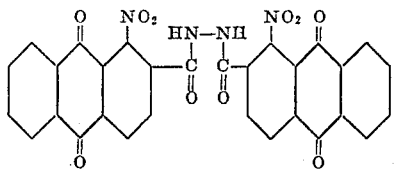

is filtered off, and washed with nitrobenzene and alcohol. It is obtained in a yield of 207 parts and has a melting range of from 296° to 297° C.

Example 7

30 parts of N,N'-di(1'-nitroanthraquinone-2'-carbonyl)-hydrazine, 60 parts of thionyl chloride and 450 parts of nitrobenzene are heated under reflux to 170° C. for three hours. Very compact crystals of 2,5-di(1'-nitro-2'-anthraquinonyl)-1,3,4-oxdiazole of the formula:

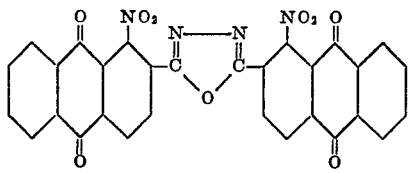

are formed which are filtered off, washed with nitrobenzene and alcohol, giving a yield of 24.5 parts. It dissolves in sulfuric acid as a colorless solution. Upon vatting with caustic and hydrosulfite, the attractive dyestuff of Example 3 is formed. It dyes bright red shades from a brown-red vat that are fast to alkali under the usual fastness tests.

Example 8

45 parts of N,N'-di(1-nitroanthraquinone-2-carbonyl)-hydrazine, 3 parts of water, 300 parts of a 30% sodium hydroxide solution and 90 parts of sodium hydrosulfite are heated in a closed system to 60° C. (to prevent decomposition of the hydrosulfite in the air). The soluble vat is filtered, and, upon aeration, the N,N'-di(1-aminoanthraquinone - 2 - carbonyl) - hydrazine separates out in a yield of 24 parts. This unring closed product dyes cotton dull red shades that change to violet with alkali.

Example 9

21 parts of 1-nitroanthraquinone-2-carbonylhydrazine, 21 parts of 1-nitroanthraquinone-6-carbonyl chloride and 300 parts of nitrobenzene are heated at from 170° to 175° C. for three hours. The N -(1-nitroanthraquinone-2-carbonyl)- N'-(1''-nitroanthraquinone - 6''- carbonyl)- hydrazine is filtered, washed with nitrobenzene and alcohol, and dried. It is obtained in a yield of 33 parts and has a melting range of from 284° to 285° C.

By reduction with hydrosulfite and caustic, as in Example 8, the corresponding diamino body is obtained which, on vatting, has some affinity for cotton, dyeing in dull red shades that change to violet with alkali.

Example 10

15 parts of N-(1-nitroanthraquinone-2-carbonyl)- N'-(1'' - nitroanthraquinone - 6'' - carbonyl)-hydrazine (of Example 9), 30 parts of thionyl chloride and 150 parts of nitrobenzene are heated under reflux at 180° C. for ten hours. The 2(1'-nitro-2'-anthraquinonyl) - 5(1''- nitro-6''-anthraquinonyl)-1,3,4-oxdiazole is filtered off and washed with nitrobenzene and alcohol. It is obtained in a yield of 11.7 parts.

In contrast to the unring-closed product, this product may be reduced in a caustic-hydrosulfite vat and dyed on cotton simultaneously to give attractive yellowish-red shades (from a red vat) that do not change with excess alkali.

The dyestuff is represented by the formula:

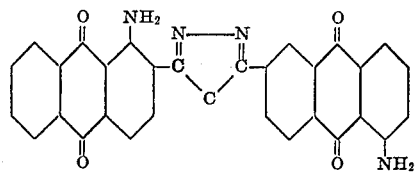

Example 11

5 parts of N-(1-aminoanthraquinone-2-carbonyl)-N'-(anthraquinone-2'-carbonyl)- hydrazine of the formula:

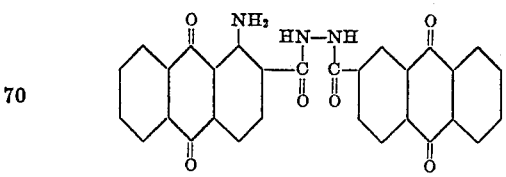

prepared by reacting 1-aminoanthraquinone-2-carboxylic acid hydrazide with anthraquinone-2- carbonyl chloride in nitrobenzene are dissolved in 100 parts of chlorosulfonic acid. The solution is heated at from 90° to 95° C. until a test no longer changes blue with alkali. The product is then drowned in water and isolated in good yield.

It dyes cotton fast yellowish-red shades from a brownish-red alkaline hydrosulfite vat, and has the formula:

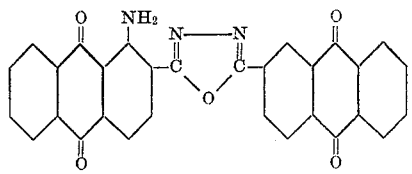

Example 12

55 parts of di(1-nitroanthraquinone - 2 - carbonyl)-hydrazine, 800 parts of nitrobenzene, 110 parts of thionyl chloride are refluxed at 160° to 170° C. for three hours. The excess thionyl chloride is blown out with air at 160°–170° C. The reaction mass is heated to 190° C., and ammonia is passed through the solution for three hours. The 2,5-di(1'-amino-2'-anthraquinonyl) - 1,3,4 - oxdiazole crystallized out as uniform red crystals.

In the above examples, it is shown that the 2,5-di(1'-amino-2'-anthraquinonyl) - 1,3,4 - oxdiazole can be prepared directly from the 1-aminoanthraquinone-2-carbonyl chloride or from the 1-nitroanthraquinone-2-carbonyl chloride. In the same manner, the 1-chloroanthraquinone-2-carbonyl chloride can be condensed with hydrazine and the resulting 1-chloroanthraquinone-2-carboxylic acid hydrazide may be further condensed with a second mol of 1-chloroanthraquinone-2-carbonyl chloride in an inert solvent such as nitrobenzene to give the N,N'-di(1-chloroanthraquinone-2-carbonyl)-hydrazine which has a melting point of 366° C. This product can then be ring closed, such as by heating in 10 parts of chlorosulfonic acid at 90°–95° C. for one hour, to give the corresponding 2,5 - di(1'-chloro-2'-anthraquinonyl)-oxdiazole which, on treatment with ammonia at 180° C. in the presence of a copper catalyst, is converted to the corresponding diamino derivative of Example 3.

The mono-acid hydrazides may be prepared satisfactorily in water by condensing the acid chloride with the hydrazine sulfate or the hydrazine in the presence of an acid-binding agent such as soda ash. This reaction is preferably carried out at temperatures of between 60° and 75° C. to insure complete reaction and avoid unnecessary by-product formation.

The di-acid hydrazides are preferably formed from the mono-acid hydrazide by heating with the acid chloride in an inert solvent at temperatures of from 120° to 200° C.

The ring closure of the di-acid hydrazide to the oxdiazole is preferably carried out in an inert organic solvent with thionyl chloride or p-toluene sulfonic acid, although other acid ring closing agents may be employed. With chlorosulfonic acid or other strong acid ring closing agents, the temperature should be carefully controlled to prevent unnecessary by-product formation, and, as illustrated in the examples, such agents may be employed as the reaction medium. With the preferred ring closing agents, the ring closure is preferably carried out at 170° to 200° C.

Where the nitroanthraquinone carbonyl chlorides are employed the resulting nitro-oxdiazoles may be reduced as illustrated in the above examples, or they may be replaced by heating with ammonia at temperatures of from 190° to 200° C. prior to isolation of the dye from the organic solvent in which it is formed.

I claim:

1. 2,5 - di(2' - anthraquinonyl) - 1,3,4 - oxdiazoles which carry in at least one of the anthraquinone radicals in the 1'-position a radical of the group consisting of $NO_2$ and $NH_2$.

2. 2,5-di(1'-amino-2'-anthraquinonyl) - 1,3,4-oxdiazole.

3. 2,5 - di(1' - nitro - 2' - anthraquinonyl) - 1,3,4-oxdiazole.

4. 2-(1' - amino - 2' - anthraquinonyl) - 5 - (1''-amino-6''-anthraquinonyl)-1,3,4-oxdiazole.

FREDERIC B. STILMAR.

No references cited.

Certificate of Correction

Patent No. 2,464,831.

March 22, 1949.

FREDERIC B. STILMAR

It is hereby certified that errors appear in the printed specification of the above numbered patent requiring correction as follows:

Column 3, lines 31 to 38 inclusive, for that portion of the formula reading column 4, lines 57 and 58, for that portion of the formula reading

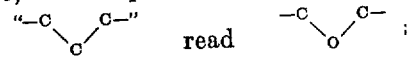

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*